United States Patent
Vosoughkia

(10) Patent No.: US 7,314,215 B2
(45) Date of Patent: Jan. 1, 2008

(54) UNIVERSAL ANGLE SELF-ADJUSTING V-BLOCK WORKPIECE HOLDER

(76) Inventor: David Vosoughkia, 24881 Lirio, Mission Viejo, CA (US) 92692

( * ) Notice: Subject to any disclaimer, the term of this patent is extended or adjusted under 35 U.S.C. 154(b) by 147 days.

(21) Appl. No.: 11/110,197

(22) Filed: Apr. 20, 2005

(65) Prior Publication Data

US 2006/0237889 A1    Oct. 26, 2006

(51) Int. Cl.
*B23Q 3/00*    (2006.01)
(52) U.S. Cl. ..................... 269/296; 269/902
(58) Field of Classification Search ........... 269/296, 269/902, 287, 156
See application file for complete search history.

(56) References Cited

U.S. PATENT DOCUMENTS

| | | | | |
|---|---|---|---|---|
| 1,923,967 | A | * 8/1933 | Brown, Jr. .................. | 279/53 |
| 4,121,814 | A | * 10/1978 | Prior .......................... | 269/98 |
| 4,151,984 | A | 5/1979 | Zapart | |
| 4,438,913 | A | * 3/1984 | Hylla ......................... | 269/60 |
| 4,445,678 | A | 5/1984 | George | |
| 4,446,622 | A | 5/1984 | Lamphere | |
| 4,655,654 | A | 4/1987 | Portas | |
| 4,854,568 | A | 8/1989 | Baeza et al. | |
| 5,193,791 | A | 3/1993 | Schwarz | |
| 5,918,868 | A | 7/1999 | Bruchmann | |
| 6,082,722 | A | 7/2000 | Cvijanovic | |
| 6,237,907 | B1 | 5/2001 | Lawrence | |
| 6,247,690 | B1 | 6/2001 | Wolf | |
| 6,254,077 | B1 | * 7/2001 | Riley, Jr. .................... | 269/287 |
| 6,262,514 | B1 | 7/2001 | Bansevicius | |
| 6,481,937 | B1 | 11/2002 | Sommerfeld et al. | |
| 6,601,839 | B1 | 8/2003 | Collins | |
| 2006/0237889 | A1 | * 10/2006 | Vosoughkia ................ | 269/296 |

* cited by examiner

*Primary Examiner*—Lee D. Wilson
(74) *Attorney, Agent, or Firm*—Michael A. Shippey; Law Offices of Karla Shippey

(57) ABSTRACT

A new and improved pivotally angled V-block work holding instrument that embodies the varied uses of the present invention is herein introduced. It provides a holding device to enable the support of a workpiece for machine tooling comprised of a base block having a rectangular flat bottom surface, two upright inverted W's positioned laterally and symmetrically, and two pivoting panels attached between them at the apex of each point by a hexagonal screw. The general purpose of the pivoting heads is to enable independent adjustability of varying angles. This provides greater choice of applications for supporting a variety of angled objects.

7 Claims, 3 Drawing Sheets

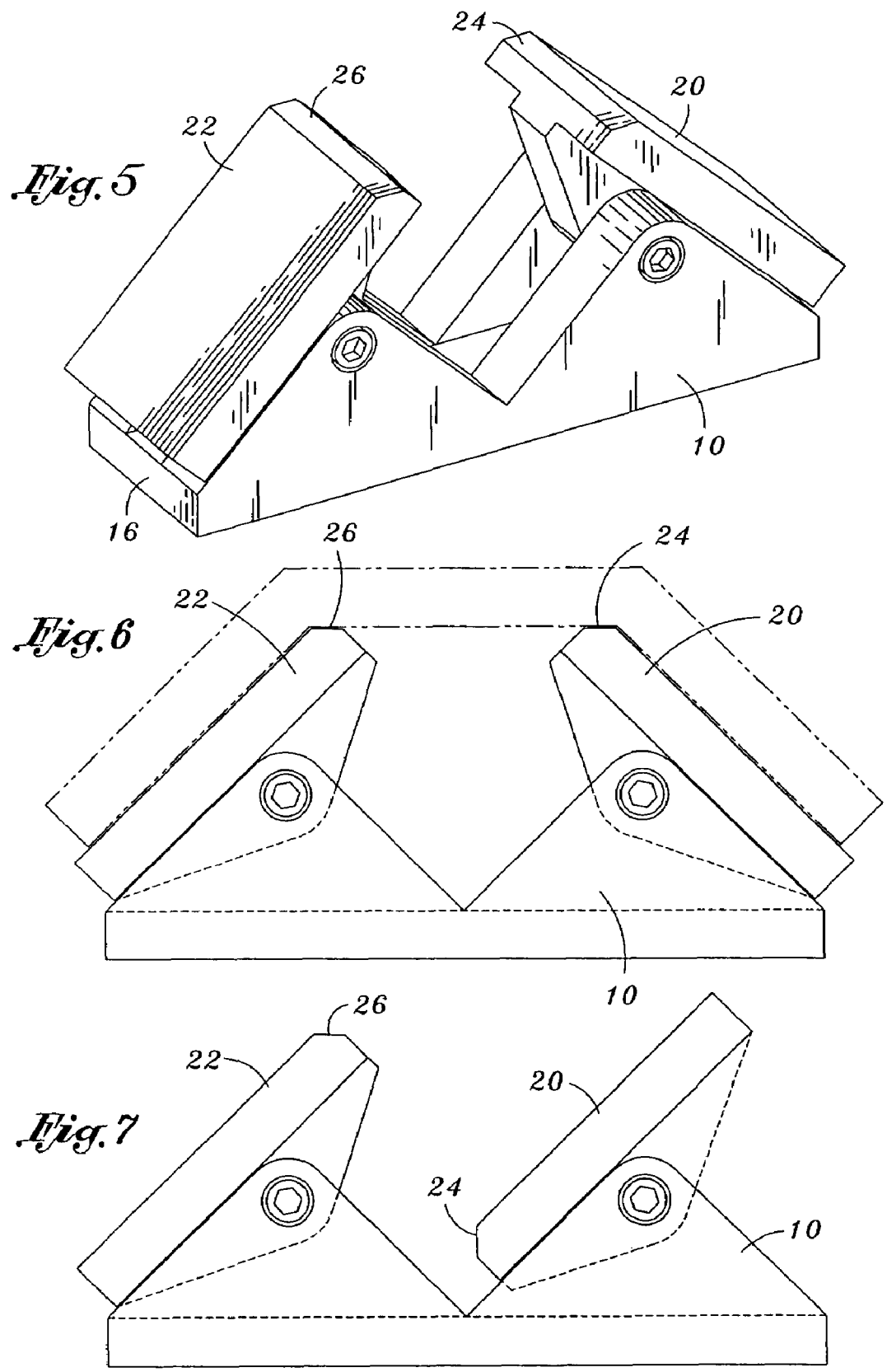

UNIVERSAL ANGLE SELF-ADJUSTING V-BLOCK WORKPIECE HOLDER

BACKGROUND OF THE INVENTION

1. Field of the Invention

The present invention relates to the field of machine tool holding V-blocks, and more particularly to independently self-adjustable, pivoted V-grooved blocks.

2. Description of Related Art

Prior art has developed various designs in V-block fixtures, which can be easily constructed and manufactured. Previous embodiments for clamping and/or supporting an angled, cylindrical or block-shaped workpiece disclose unique, yet limiting, methods for the securing and machining of a said workpiece in the appropriate pre-determined size.

Descriptions of typical prior art devices for clamping and holding workpieces during machining operations are found in the following: U.S. Pat. No. 4,854,568 includes a pair of identical heptagonal blocks having a plurality of planar angled side panels for orienting cylindrical work pieces at predetermined angular degrees; U.S. Pat. No. 5,193,791 involves a three point parallel holding device which integrates a circular internal bore to secure irregularly shaped workpieces against the jaws of a vice. Another previously introduced invention relative to that which is described in the present embodiment is U.S. Pat. No. 6,237,907 which utilizes dual jawed adjustable workpiece holders and a pre-determined calculation of the angles at which the device must be adjusted to achieve an accurate machining at the necessary points.

A major shortcoming of these previous embodiments is that they typically do not allow for the adjustability of the device in the purpose of holding work pieces of different measurements, shapes, or specifications. Often they have different non-adjustable locations for the holding of different shapes and sizes of work pieces. Given the wide variation in size and exterior shape of potential work pieces, this lack of adjustability is a serious limitation to existing technology.

BRIEF SUMMARY OF THE INVENTION

The present invention is best described as a freely adjustable holding device for the purpose of holding materials to be machined or otherwise worked on.

It is an object of the present invention to allow adjustability in the overall design so that it may form surfaces of variable angles, both acute and obtuse, including those greater than 180 degrees, for the purpose of supporting a workpiece. This machining device may be constructed from high-grade steel, heavy-duty plastics, hard woods, or other such durable materials or combinations thereof.

A rectangular base supports two separate upright inverted W's that run parallel to each other along the longer edges of the rectangular base. A channel of constant width runs laterally between the two opposing vertically positioned W's. Four holes located at the apex of each peak are used as insertion points for two hexagonal screws with smooth cylindrical shafts. These shafts provide a sufficient axle for the rotation of the pivoting panels to which they are attached from a through aperture extending from a ridge at the bottom of each panel. The extending portions of the separated pivotal panels are thin enough to slip between the lateral channel, and swivel easily when attached between the two vertical walls by the cylindrical shafts. Each panel is therefore allowed movement independent of the other. This provides the invention of the device, in that it supports a work piece at a variety of predetermined angular orientations during a machining operation.

BRIEF DESCRIPTION OF THE DRAWINGS

The purpose and operation of the invention will be better understood when consideration is given to the following detailed description thereof. Such description makes reference to the accompanying drawings wherein:

FIG. 5: illustrates the pivotal panels in opposing outward facing positions from a side elevational view.

FIG. 6: shows a side view of a suggested machining position wherein pivotal panels are positioned outward on opposing sides of the inverted W of the base block.

FIG. 7: depicts a side view of the V-block with pivotal panels positioned symmetrically facing to the left angles on the inverted W.

Figure 1:
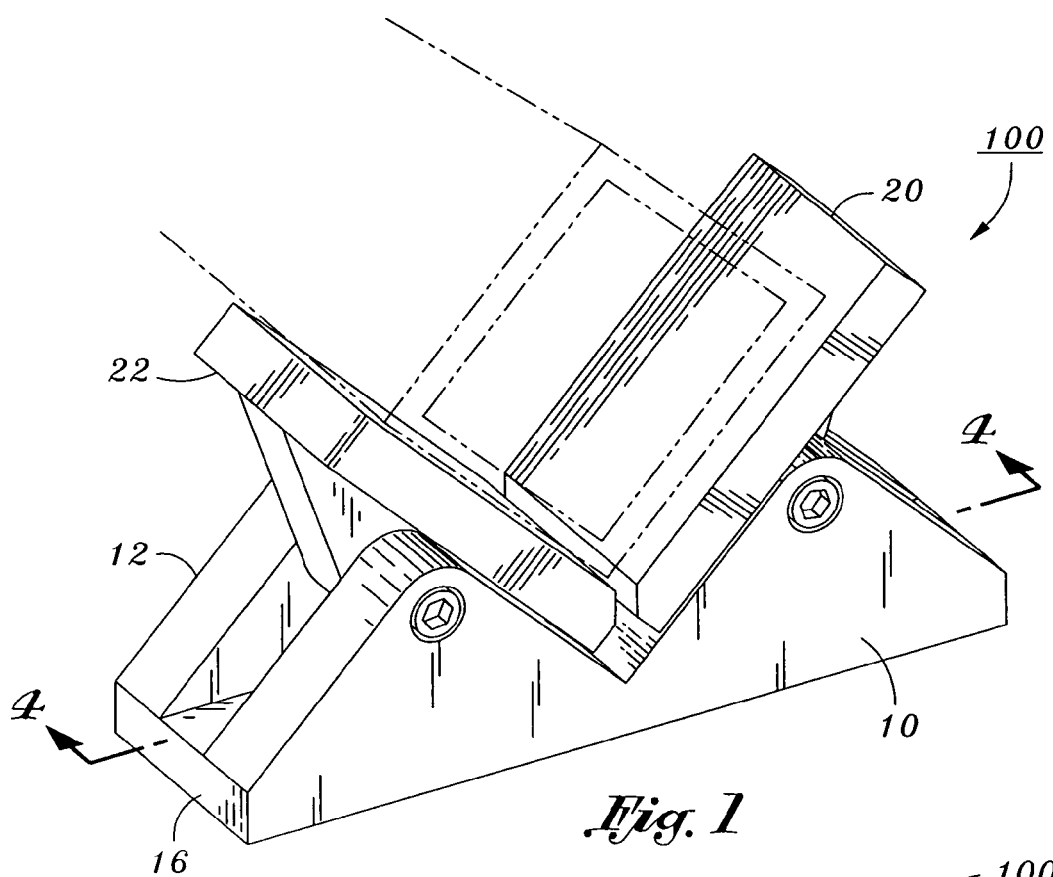
FIG. 1: is a perspective view of the pivotally adjustable angle V-block holding a hypothetical workpiece. The workpiece is shown in dotted outline, and is not part of the current invention.

With respect to the above description, it is to be realized that the optimum dimensional relationships for the parts of the invention, to include variations in size, shape, assembly and use, are deemed to be readily apparent, and all equivalent relationships to those illustrated in the drawings and described in the specifications are intended to be encompassed by the present invention. Furthermore, the invention may be comprised of a variety of hard materials of construction, including but not limited to metal, wood, and hard plastic or other synthetic material.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

The current invention is a new and improved pivotally angled V-block work holding instrument that embodies the varied uses of the present invention is herein introduced. It is an object of the present invention to provide a holding device to enable the support of a work piece for machine tooling comprised of a base block having a rectangular flat bottom surface, two upright inverted W's positioned laterally and symmetrically, and two pivoting swivel heads attached between them at the apex of each point by a hexagonal screw. Each separate swivel has a lower portion thinly extending in a solid V-shape from the bottom center of each panel which includes a thru aperture located near the apex of said V. The two flat swivel heads are positioned at opposite ends on the upper surface of the present embodiment, and each are pivotally connected by a screw to the side panels of the base block on either side at each apex of the inverted W. The general purpose of the pivoting heads is to enable independent adjustability of varying angles. This provides greater choice of applications for supporting a variety of angled objects.

The utility of the current invention is to position work pieces of various shapes and sizes so that they can be worked on, typically by a machinist, using tools such as a saw or drill, or other cutting, polishing, or work piece modifying devices. The current invention holds the work piece solely due to the weight of the work piece itself. However, clamps, vices, or other attachment means can be used to secure the device, if gravity alone is insufficient.

Note that the shape of the work piece is not critical, as the versatility of the current invention will adapt to virtually any work piece that is not too large or small for the swivel heads of the current invention. (Of course, the current invention can be produced in a range of sizes to handle larger or smaller work pieces.) The swivel heads can adapt to hold straight-edged, curved edge, convex or concave work pieces.

The current invention will be further described in terms of the accompanying figures.

FIG. 1: displays the current invention 100 from a perspective view from above, showing the inverted W side panels 10, 12 with a side view of the slotted area running laterally between the two side panels along the rectangular base block 16, which forms an integral piece with the two side panels. Two hexagonal head shoulder bolts, (threaded at the tail ends, yet smooth-surfaced along the center shaft to allow an unhindered pivoting motion) are inserted through the apex of each peak on one W-shaped panel to the peak on the opposing W-shaped panel, attaching the two separately pivoting surface panels, which are shown here to be positioned in a V shape. A hypothetical workpiece is depicted in the center of the pivoted panels. The workpiece itself is depicted in dotted outline, and is not part of the current invention.

Figure 2:
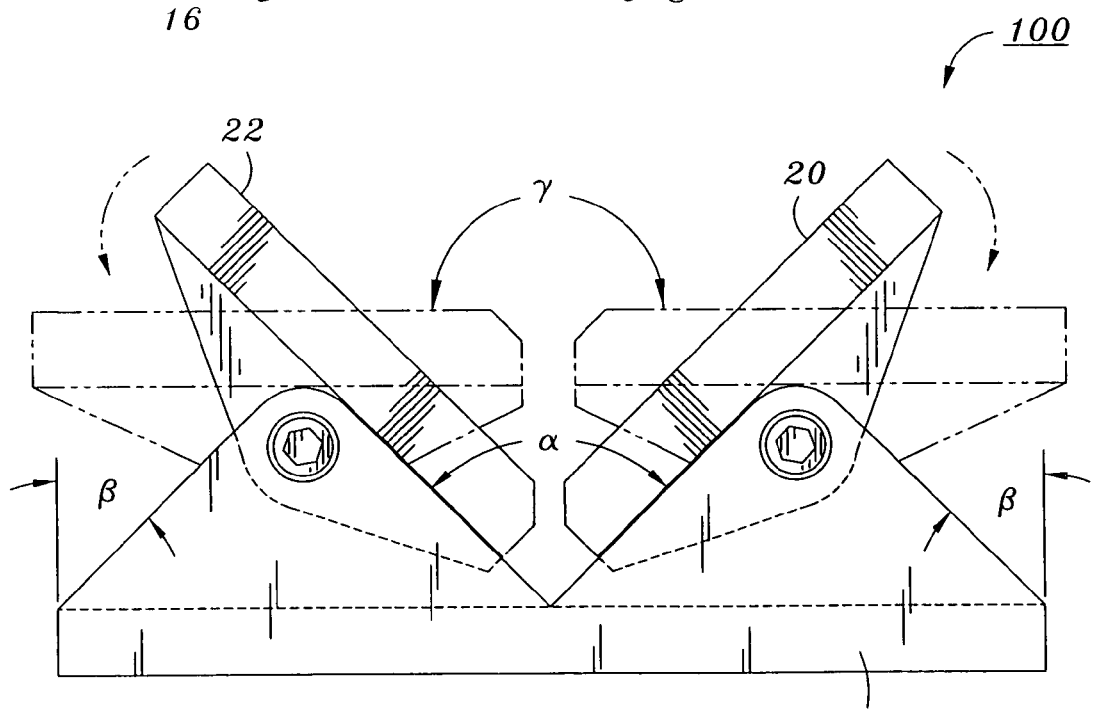
FIG. 2: is a front side view of the adjustable V-block showing the pivot action of the upper surface panels from V shape to a flat symmetrically aligned position.

FIG. 2: is a two-dimensional view of the adjustable V block invention. Displayed in dashed lines at the bottom is the flat rectangular base 16 that provides the bottom of the invention. Two triangular panels 10, 12 attached in an upright pyramid shape comprise the two peaks that form an inverted W. The shoulder bolts are inserted at the apex of each side panel. Both the left and right pivotal panels are shown in opposing positions facing inward to themselves.

Also shown in this view are the rotatable head blocks 20, 22. Letters α, β and γ with arrows demonstrate the angles involved in the swiveling action of the panels from inward to outward positions. Letter a depicts the closed-form, 90 degree angle formed by the head blocks when in closed position, in the embodiment depicted. A hypothetical dashed view depicts both head blocks pivoted to a level position, where the angle γ formed is a horizontal 180 degrees. When in the most open position, in the embodiment depicted, the head blocks actually form an angle of 270 degrees, as required by the fixed 45 degree angle of β, which marks the upward slope of the inverted W side panels.

It should be noted that the head blocks are limited in their rotation by the angles of α and β, as depicted in FIG. 2. Other embodiments of the current invention are envisaged where the values α and β may differ from those in the figure. Thus, minimum angles of 90 degrees in closed position and 270 degrees in most open position are feasible, but not limiting on the current invention.

Figure 3:
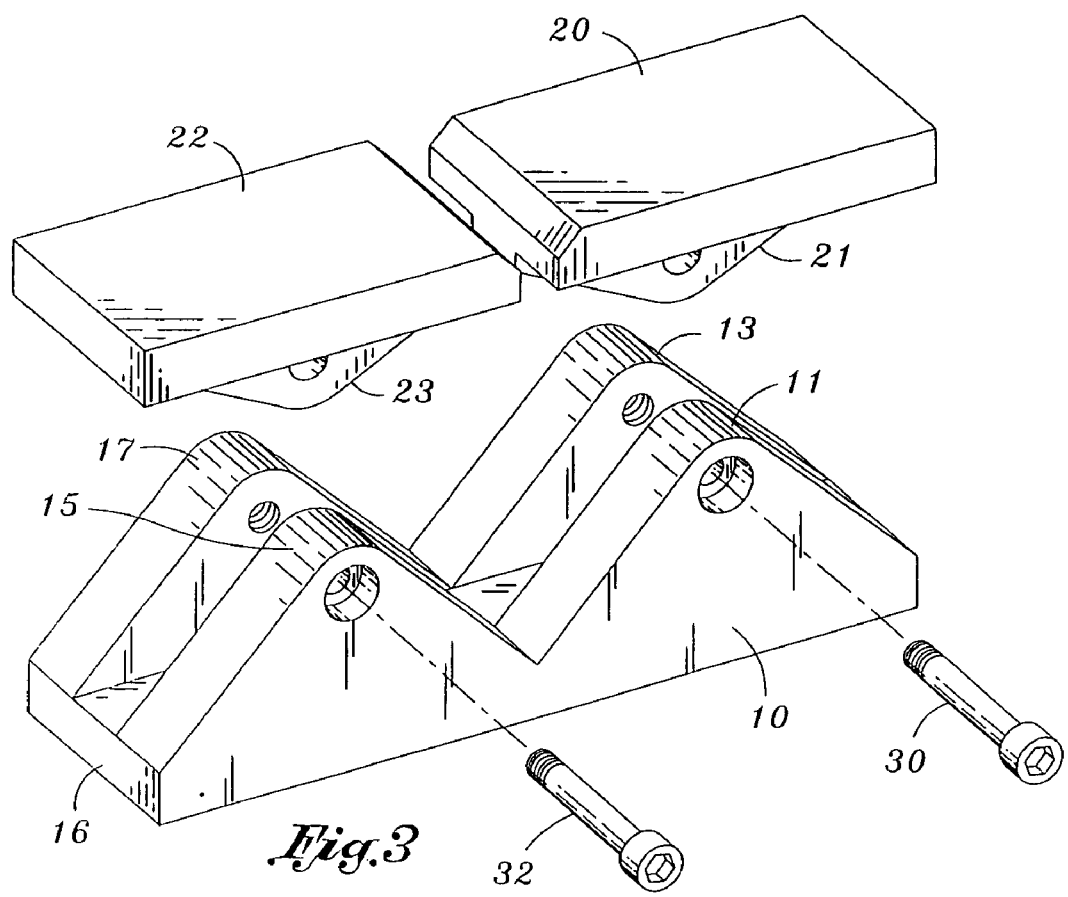
FIG. 3: shows a mechanically separated pictorial of the device, wherein said device is comprised of 5 separate pieces: the inverted W of the base block, the two separate opposing swivel panels, and two hexagonal screws which provide the pivoting axle for the upper panels.

FIG. 3: is a de-constructed view of the device to demonstrate its separate components. A slotted base block comprised of two side panels 10, 12 forming inverted W's running parallel to each other upon a solid rectangular base 16. Each side panel thus has two apexes, noted as 11 and 15 for the right and left side, respectively, of side panel 10; and on side panel 12, the apex opposing apex 11 is denoted apex 13, while the apex opposing apex 11 is denoted apex 17.

Two shoulder bolts 30, 32 are threaded at the ends yet smooth in the center to provide a smooth axis for the swiveling action of the two swivel heads, which will be attached by these between each apex. Bolt 30 passes through an aperture near apex 11, and is screwably engaged in a threaded aperture near apex 13. Similarly, bolt 32 passes through an aperture near apex 15, and is screwably engaged in a threaded aperture near apex 17. By this means, each pivoting head is allowed independent movement for the enabling of a variety of machining angles or specifications of a particular workpiece.

Figure 4:
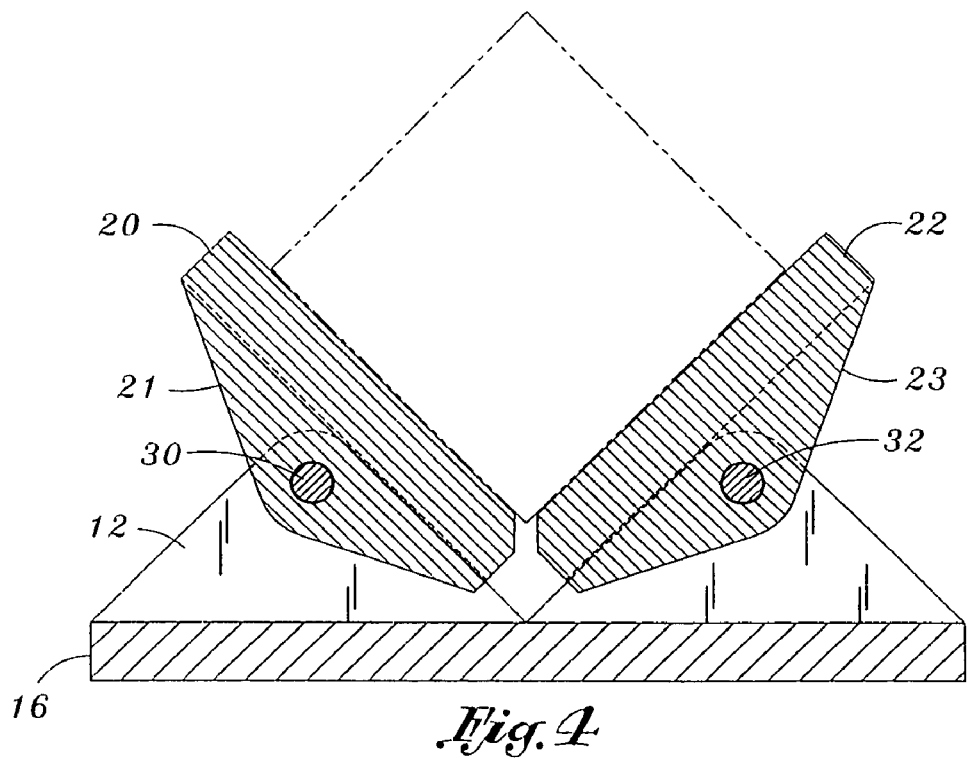
FIG. 4: depicts a rear side view of the V-block with the two adjustable panels supporting a dotted hypothetical workpiece.

FIG. 4: is a simplified two-dimensional shaded depiction of the constructed embodiment from the rear. The invention is shown in the traditional V-shape. Each pivoting head is in a darker shade than the other components of the invention. A dashed hypothetical view of a suggested workpiece is depicted in the center of the positioned panels. In this closed position, the current invention can hold a square or rectangular work piece.

FIG. 5: An angled perspective view of the present invention is shown. From this downward view the slotted center of the rectangular base 16 is clearly shown running laterally along the center of the two inverted W's of side panels 10, 12. The two pivotable swivel heads 20, 22 are positioned on the outer edges of the vertical peaks in an "open" position, each facing in a mirrored symmetry to the outside of the device in opposing directions.

It can be seen in this view that the opposing edges 24, 26 of the swivel heads are not flush—ie, not at 90 degrees to the top surface of the swivel head—but in fact are beveled. This feature allows the head to contact and form a smooth receiving surface when in closed position, as shown back in FIG. 1. In the present embodiment, the upper half of each edge 24, 26 is beveled to a 45 degree angle relative to the top surface, while the lower half of each edge is 90 degrees relative to the top surface.

FIG. 6: is a two-dimensional version of the device from the side view, though in the same position as that which is described in FIG. 5. The outward facing panels are pivoted in opposing mirrored positions to support the angles of the hyphenated implied workpiece. This demonstrates the varied angles and degrees that can be attained by said V-block.

FIG. 7: is a simplistic side view from the front of the device. The pivoting panels are independently positioned in symmetrical positions, both facing to the left of the device in their outermost swing. This is not a likely position for holding a work piece, but nevertheless shows the versatility of movement of the swivel heads.

The swivel heads can be linked, such that they move in coordinated fashion. In the preferred embodiment depicted, the two swivel heads can pivot independently. This provides more flexibility, and simpler construction.

The foregoing is to be considered as illustrative in purpose only. Furthermore, as various modifications and changes may arise in design relative to those aforementioned, it should be noted that this description is not designed to limit the scope of the invention to the exact model and operation as that which is shown and described, and accordingly, all other modifications and similarities may be allowed which fall within the embodiment of the present invention.

I claim:

1. A device for the holding of a work piece, comprising:
a base block, having a flat surface for a base, said base comprising the shape of a rectangle;
an opposite upper portion comprising two parallel ridges, each in the shape of an inverted W;
said ridges extending from one edge to the opposite edge of said base block;
each said ridge possessing two thru apertures, located near the apexes of the W;
said ridges separated by a thru channel of constant width along the entire length of said block;
further comprising two upper swivel heads;
each swivel head possessing a flat upper surface and a lower side in the shape of a solid V;
said lower side being sufficiently thin to pass into the thru channel of said base block;
each said swivel head possessing a thru aperture near the apex of the V;
each said swivel head being pivotably connected to the base by means of a smooth-surface bolt passing thru one side of an aperture in one ridge of the base, and further thru the aperture in said swivel head, and further thru the aperture in the opposite ridge, said bolt providing an axle around which said swivel head can rotate.

2. A device for the holding of a workpiece, comprising:
a base block, having a flat surface for a base and an upper portion containing at least one V-groove formed therein;
at least two smaller swivel heads, said swivel heads each comprising a flat upper surface;
wherein said swivel heads are pivotably connected to the base block in an opposable fashion on either side of the V-groove; wherein
said swivel heads are independently adjustable to form a surface of variable angles up to greater than 180 degrees, and,
wherein said swivel heads can be disposed so as to form a cooperative surface for holding a work piece.

3. The device of claim 2 wherein each said swivel head has a lower portion comprising a solid V shape, and further comprising a thru aperture near the apex of said V.

4. The device of claim 2 wherein said base block has an upper surface comprising the shape of an inverted W, and further comprising two thru apertures, one located near each apex of said W.

5. The device of claim 2 wherein said base block has an upper surface comprising two parallel ridges, each in the shape of an inverted W, said ridges extending from one edge to the opposite edge of said base block, said ridges separated by a thru channel of constant width along the entire length of said block.

6. The device of claim 5 further comprising cylindrical shafts far passing thru said apertures to form axles around which said swivel heads can rotate.

7. The device of claim 6 wherein said cylindrical shafts comprise shoulder bolts.

* * * * *